Figure 1:
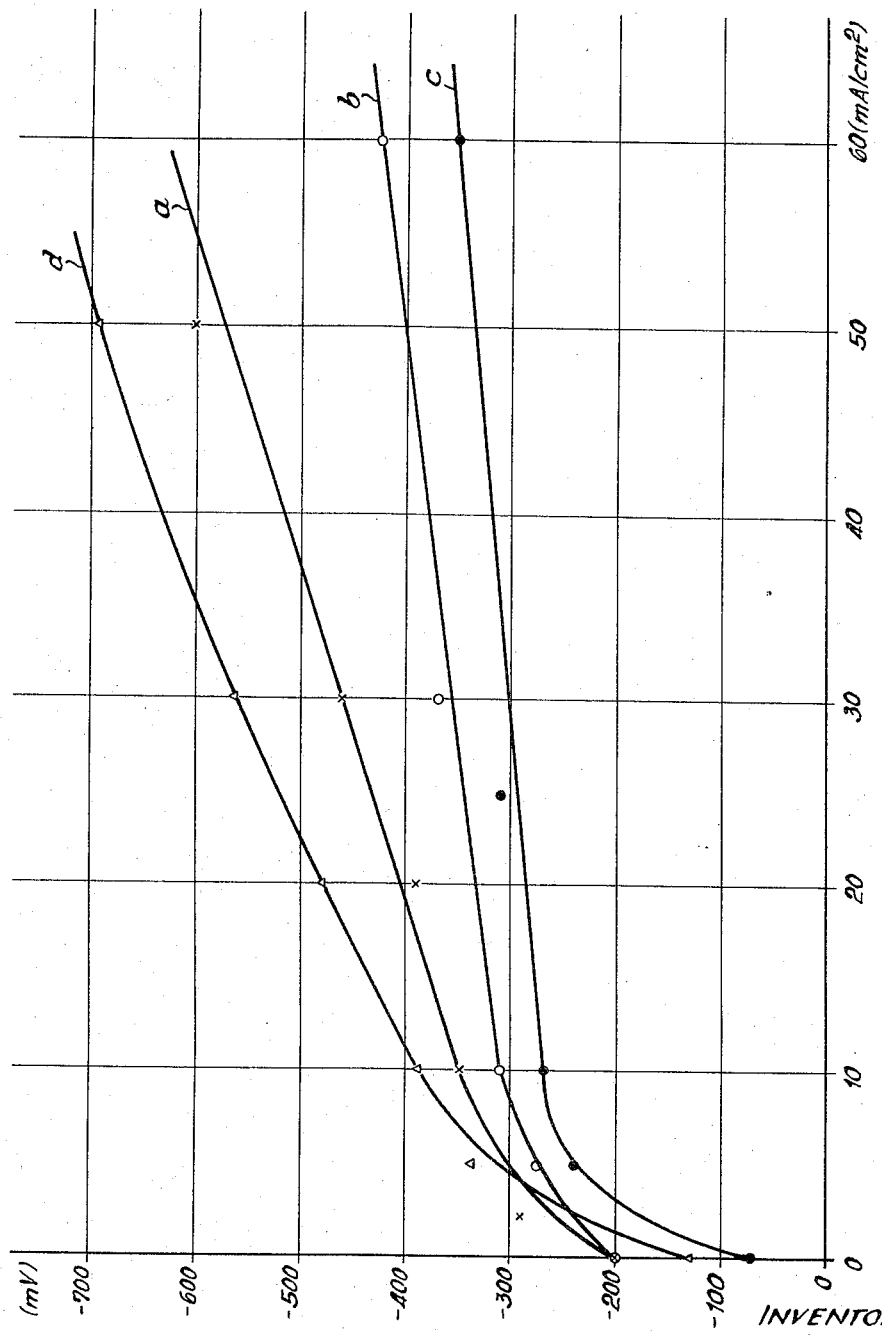

Jan. 23, 1968 W. VIELSTICH ET AL 3,365,333
OPERATION OF FUEL CELL FOR THE DIRECT CONVERSION INTO
ELECTRICAL ENERGY OF CHEMICAL ENERGY OF LIQUID
FUELS DISSOLVED IN THE ELECTROLYTE
Filed May 3, 1961 4 Sheets-Sheet 4

INVENTORS:
WOLF VIELSTICH
GERHARD GRÜNEBERG
BY
Burgess, Dinklage & Sprung
ATTORNEYS United States Patent Office  3,365,333
Patented Jan. 23, 1968

3,365,333
OPERATION OF FUEL CELL FOR THE DIRECT CONVERSION INTO ELECTRICAL ENERGY OF CHEMICAL ENERGY OF LIQUID FUELS DISSOLVED IN THE ELECTROLYTE
Wolf Vielstich, Bonn, and Gerhard Grüneberg, Oberhausen-Holten, Germany, assignors, by mesne assignments, to Varta Aktiengesellschaft and Siemens-Schuckertwerke Aktiengesellschaft, Erlangen, Germany, both corporations of Germany
Filed May 3, 1961, Ser. No. 107,426
Claims priority, application Germany, May 6, 1960, R 27,911
5 Claims. (Cl. 136—86)

The present invention relates to the operation of fuel cells for the direction conversion into electrical energy of the chemical energy of liquid fuels dissolved in the electrolyte of the cell, and more particularly to the provision for a solid ion exchange membrane serving as electrolyte for the oxygen electrode of the cell, which separates the fuel-electrolyte mixture and the fuel electrode from the oxygen electrode.

In one known method for the direct electro-chemical conversion into electrical energy of the chemical energy of combustible liquids by the reaction in a single-element fuel cell, the liquid fuels are completely mixed with the liquid electrolyte, and where the materials used are insoluble in the electrolyte the same are rendered soluble by means of dissolving intermediaries (solubilizers).

It is also known to use ion exchange diaphragms or membranes as solid electrolyte rather than liquid electrolyte in fuel cells having two gas diffusion electrodes, each electrode being connected with a separate gas chamber, such that one of the electrodes is fed with a gaseous fuel rather than a combustible liquid fuel and the other is fed with an oxygen-containing gas.

It is well recognized that when using fuels, which are susceptible to direct oxidation by oxygen, dissolved in the electrolyte or bubbled therethrough, or where the electrode material of the oxygen electrode is of the type that causes chemical conversions of the fuel thereat, fuel losses are often encountered in the operation of fuel cells in the foregoing general manner. It is especially with the use of liquid equilibrium electrolytes in which glycol, formate, etc. are dissolved as the liquid fuels and where temperatures in excess of 100 degrees C. prevail, that the electrode materials of the oxygen electrode in contact with the electrolyte cause chemical conversions. In this connection, oxygen electrode materials, such as silver, Raney silver, and double skeleton catalyst electrodes containing Raney silver as well as silver-activated carbon electrodes, cause such chemical conversions. This is true even when no current is drawn. Such conversions proceed at a non-negligible and even at a significant rate.

It will be appreciated that normally in fuel cells the admixture of liquid fuel with the liquid electrolyte causes undue polarization of the oxygen electrode. In some cases, the oxygen potential is shifted significantly toward the hydrogen potential whereby an oxygen-hydrogen mixed potential results causing a voltage drop in the cell. This is true since a dehydrogenating effect may occur such that the oxygen electrode actually consumes fuel.

It is, therefore, an object of the present invention to avoid the foregoing disadvantages and to provide an apparatus and method for operating fuel cells wherein the oxidizing gas is provided with a separate, solid electrolyte such that the oxygen electrode is prevented from contacting the liquid fuel-containing electrolyte.

Figure 2:
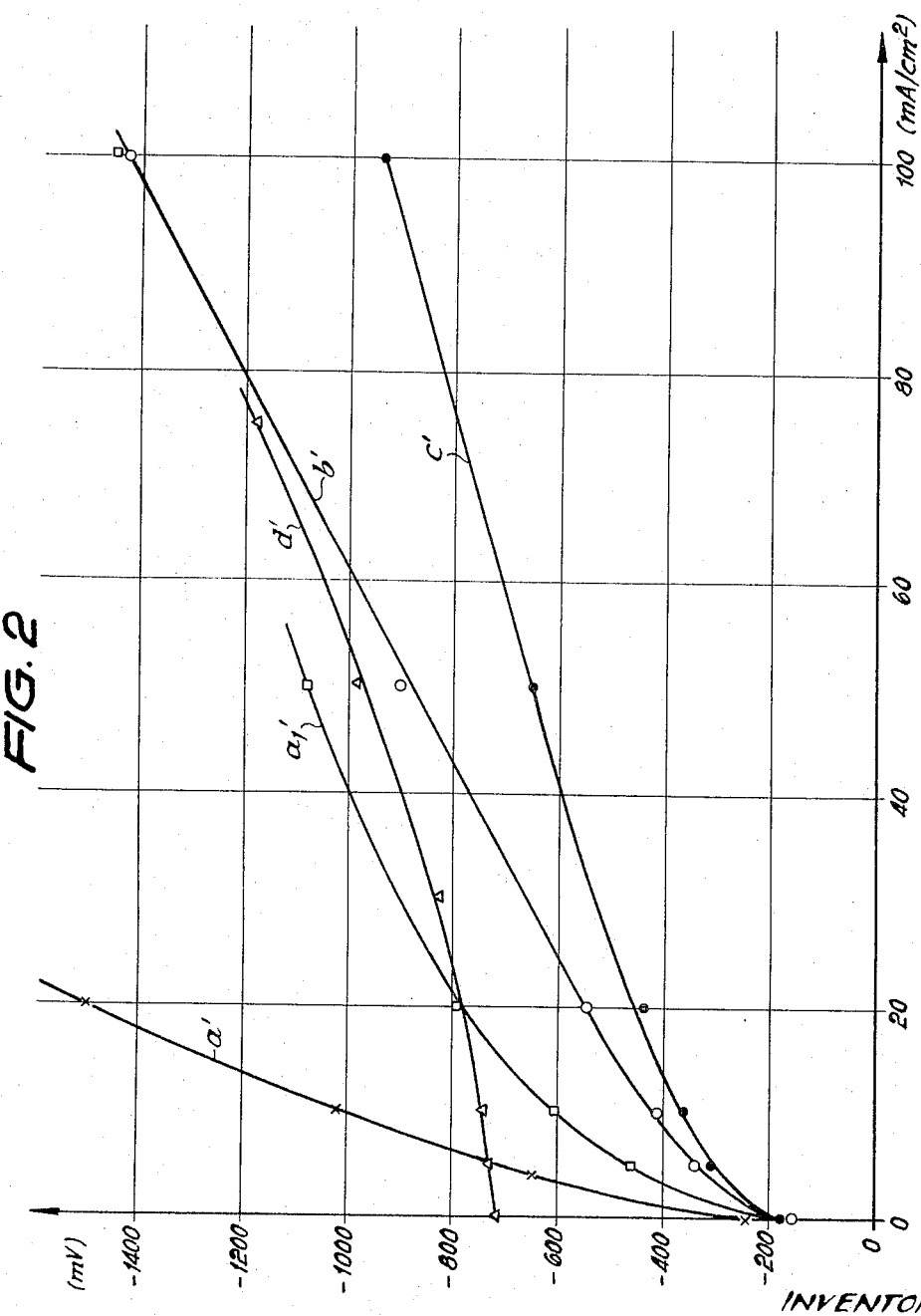
Figure 3:
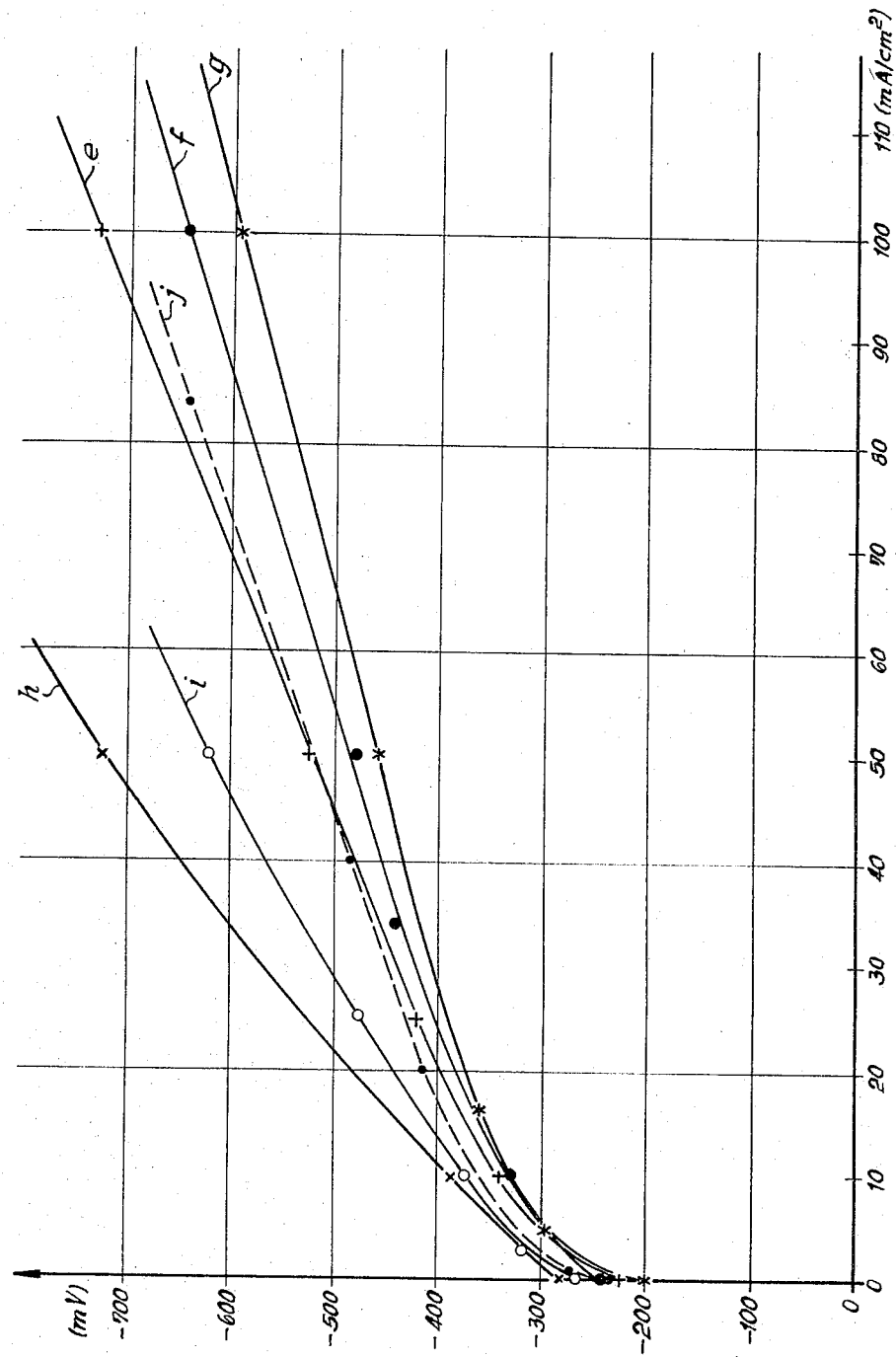
Figure 4:
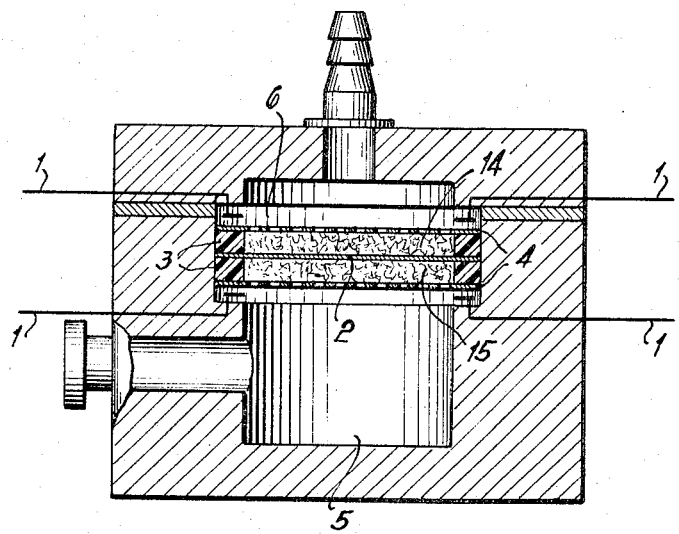
Figure 5:
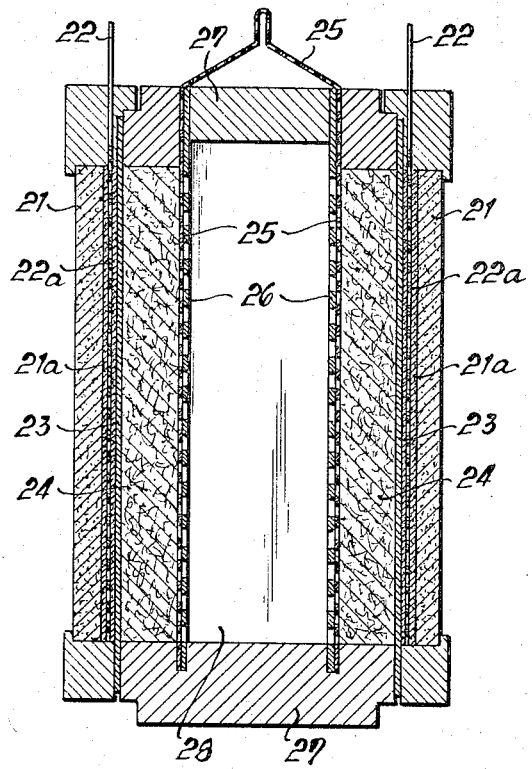

Other and further objects of the invention will become apparent from a study of the within specification and accompanying drawings, in which:

FIGURES 1–3 illustrate the current voltage characteristics of carbon-oxygen electrodes with respect to a saturated calomel electrode, FIGURE 4 illustrates schematically the fuel cell apparatus in accordance with the invention having an ion exchange diaphragm separating the oxidizing gas electrode from the liquid-fed fuel electrode and the liquid mixture of fuel and electrolyte therefor, and FIGURE 5 illustrates schematically a further embodiment of a fuel cell in accordance with the invention having a central chamber for the liquid mixture of fuel and electrolyte, while the oxidizing gas electrode is in communication with the atmosphere.

With respect to FIGURE 1, the current voltage characteristics of carbon gas diffusion electrodes with respect to the saturated calomel electrode in pure potassium hydroxide solution is shown. The carbon gas diffusion electrodes used were all pre-activated by the so-called "Braunschweig process," i.e. alternate heating and chilling by immersion in water (see U.S. Patent 1,912,478). The electrodes were operated at 20 degrees C. and an oxygen pressure of 0.9 kilogram per square centimeter gauge was used. The electrolyte consisted of 5.4 normal caustic potash solution. Voltage and current intensity can be derived from the coordinates of the graph of FIGURE 1. In addition to the current voltage characteristic $a$ of an activated carbon electrode, three additional curves $b$, $c$, and $d$ are shown. For curve $b$, activation of the carbon with aluminum and cobalt was carried out, while for curve $c$, activation of the carbon with silver, iron, and copper, respectively, was achieved. The activation was carried out by immersion of the carbon electrode into the solution of the corresponding salts of these metals, i.e. in this case nitrates, and subsequently heating the carbon electrode to 800–900 degrees C. (in the case of curve $b$) and to 200–300 degrees C., (curve $c$), respectively. On the other hand, platinizing of the carbon electrode was effected by cathodic deposition at about 10 ma./cm.$^2$ from a 10% platinum(IV)-hydrogen chloride solution, and results thereof are shown in curve $d$.

FIGURE 2 shows corresponding current voltage characteristics for mixtures of glycol and caustic potash solution with respect to carbon and oxygen electrodes compared with a saturated calomel electrode. In this case, curve $a'$ for the carbon activated in the foregoing manner by heating and chilling, was obtained using a 6 normal caustic potash solution which was 5 molar with respect to glycol. The operation was carried out at 40 degrees C. and at an oxygen pressure of 0.92 kilogram per square centimeter gauge. The other curves in FIG. 2: $a'_1$, $b'$, $c'$, tion which was 3 molar with respect to glycol at 20 degrees C. using an oxygen pressure of about 0.9 kilogram per square centimeter gauge. With respect to curves $b'$, $c'$, and $d'$, the corresponding electrodes were activated in the same manner and with the same metals as the electrodes used in the case of curves $b$, $c$, and $d$, respectively and $d'$ were all obtained in a 6 normal caustic potash solution of FIG. 1. The curve $a'_1$, therefore, represents the results using a 3 molar glycol solution rather than a 5 molar glycol solution as used with respect to curve $a'$.

FIGURE 3 shows corresponding current voltage curves of carbon electrodes of the foregoing type obtained in pure caustic potash solution as well as in a formate-containing solution. Curve e was obtained at 20 degrees C., curve f at 40 degrees C. and curve g at 80 degrees C. using a 5.4 normal caustic potash solution. Curve h was obtained at 20 degrees C., curve i at 40 degrees C., and curve j at 80 degrees C. using a 6.2 normal caustic potash solution which was 3 molar with respect to formate.

It can be seen in all cases that the admixture of the liquid fuel with the liquid electrolyte in direct contact with both electrodes largely increased the polarization of the oxygen electrode. The dehydrogenating effect, especially of the platinized carbon electrode is so pronounced that its potential is shifted by several tenths of a volt towards the hydrogen potential, i.e. an oxygen-hydrogen mixed potential is established resulting in a loss of electrical energy, which loss becomes perceptible by a voltage drop of the cell. Due to the dehydrogenation, the oxygen electrode consumes fuel, i.e. it represents a local cell within the main fuel cell.

Moreover, in the case of air-oxygen cells operating with non-hydrophobic carbon, it is frequently observed that the working layer is so penetrated by the electrolyte-fuel mixture that it is "drowned" and no longer operable.

It has been found in accordance with the present invention that a fuel cell for more effective direct electrochemical conversion of the chemical energy of liquid fuels dissolved in liquid electrolytes may be provided by operating the fuel cell while maintaining a solid ion exchange membrane, serving as electrolyte for the oxygen electrode in the fuel cell, separating the fuel electrode and the mixture of liquid fuel and liquid electrolyte from the oxygen electrode. Thus, the fuel cell comprises a fuel-electrolyte liquid mixture fed fuel electrode, a gas fed oxygen electrode, and a solid ion exchange membrane serving as electrolyte for the oxygen electrode and separating the fuel-electrolyte mixture and fuel electrode from the oxygen electrode.

Referring to FIGURE 4, a device is shown for carrying out the operation of a fuel cell in accordance with the invention. By means of sealing rings 3 of plastic material, a solid electrolyte ion exchange membrane or diaphragm 2 is clamped in a holder 10 in which as gas space 6 and a liquid electrolyte space 5 are recessed. Arranged on both sides of the diaphragm 2 are the metal gauzes 4, 4 between which the catalyst bed 14 is provided on the gas side as the oxygen electrode and the catalyst bed 15 on the electrolyte side as the fuel electrode for the liquid fuel admixed with the liquid electrolyte. Thus, the fuel electrode consists of a layer of pulverulent or granular catalytically active electrode material. The layer has the same thickness throughout and contacts the ion exchange diaphragm on one side thereof while the other side which faces the fuel-electrolyte liquid mixture is limited by an electrically conductive gauze or sieve or a frit. The oxygen electrode likewise consists of such a bed of catalytically active electrode material, which contacts the ion exchange diaphragm on one side thereof, while the other side faces the gas space and is limited thereat by an appropriate sieve, gauze or frit. The terminals 1 represent the current leads for the oxygen electrode 14 and the fuel electrode 15, contact between the leads 1 and the electrodes being made through the sieve or gauze 4.

The hydraulic diameter of the sieve openings of the sieve or gauze 4 is generally from 1 to 500 microns and preferably 10–300 microns. Most preferably, the sieve openings may be 30–100 microns in hydraulic diameter. The sieves or gauzes, for example, may be made from the same metal as the catalytically active portion of the electrode. However, it is also possible to use other metals, such as stainless steel, for the retaining sieve or gauze. In particular, where using an anion exchange resin material as the solid electrolyte membrane, the sieve or gauze is preferably made of nickel or silver, and, when operating the fuel cell in an acid medium, the sieve or gauze is made of alloyed high quality steel.

In place of the pulverulent or granular catalyst bed material, metal foils, gauzes, or sieves may be used as the electrode. Electrodes of this type are known per se and are generally activated by adding an active material, such as platinum thereto, for example, by electro-deposition or by any other suitable manner. Moreover, the electrodes may consist of powders of catalytically active substances which are compacted by compression or by compression and sintering. Such electrode constructions are well known in the art.

With respect to FIGURE 5, the same illustrates an embodiment of a fuel cell arrangement in accordance with the invention exemplified by using a glycol-potassium hydroxide solution as liquid fuel-electrolyte mixture. Atmospheric oxygen is used since the oxygen electrodes are constructed as solid bodies which are porous to an oxidizing gas. In the same manner, the fuel electrodes, if desired, may be constructed as compact bodies, in this case, such bodies being liquid porous.

The fuel cell of FIGURE 5 includes two disc-shaped atmospheric oxygen gas diffusion electrodes 21, 21. These electrodes consist of a mixture of carbon and polyethylene powders (particle size less than 60$\mu$) compacted by compression and mixed in the layer 21a facing the fuel electrode with silver oxide. The polyethylene was produced by low pressure polymerization, its reduced specific viscosity, determined in a 0.1% by weight solution in dekaline, amounting to about 2.5–5. The amount of silver oxide is in a ratio of 6.5 grams of silver oxide per 15 grams of the carbon polyethylene mixture.

Imbedded in the layer 21a, by pressing, is a silver wire 22, for withdrawing current from the cell. The wire 22 is in conductive connection with a silver gauze 22a. The electrodes engage the diaphragms 23, 23. On the opposite side of the diaphragms 23, in each instance, is a fuel electrode consisting of a catalyst bed of nickel double skeleton catalyst material 24 which is limited by a fine screen 25 from the chamber containing the liquid mixture of fuel-electrolyte. The screen 25, for example may have the following characteristics:

Steinhaus 32a, diameter of the sieve openings = 180 microns, thickness of the sieve = 50$\mu$, permeability, i.e. the ratio of the area of the sieve openings to the geometrical surface of the sieve, $D = 28.5\%$.

The fine screen 25 is supported by a coarse screen 26. The different parts of the electrodes are kept in position by a multi-part holder 27. The fuel-electrolyte mixture is provided in the chamber 28 so that the liquid mixture may pass through the fuel electrodes 24 and thence into contact with the ion exchange diaphragms 23 whereby the atmospheric oxygen passing through the oxygen electrodes 21 may lead to the carrying out of the desired electrochemical reaction. The fine screen 25 serves as terminal for the fuel electrode 24 in the same manner as silver wire 22 serves as terminal for the oxidizing gas electrode 21.

The ion exchange membrane or diaphragm serving as the solid electrolyte for the oxygen electrode may be prepared from commercially available ion exchange materials (see Blasius, Chromatographische Methoden in der Analytischen und Präparativen Anorganischen Chemie, F. Enke Verlag, Stuttgart, 1958, page 333, Table 40). The diaphragm or membrane used as the solid electrolyte may thus consist of either a cation exchange resin material or an anion exchange resin material provided that the material selected permits the preparation of an electrolyte diaphragm or membrane complying with the following conditions:

(1) As high as possible an ion concentration (greater than 0.1 molar)
(2) High conductivity or minimum ohmic resistance (less than 15 ohms/cm.$^2$)
(3) Minimum permeability to gas.

Suitable cation exchange resin materials for preparing the diaphragm or membrane in accordance with the invention include sulfonated polymers such as commercially available sulfonated copolymers of styrene and divinyl benzene. Especially well suited are Permaplex C–10, Amberplex C1 and Nepton CR51. Suitable anion exchange resins are Permaplex A–10, Amberplex A1, Nepton AR111.

The operating temperatures of the fuel cell in accordance with the present invention is dependent upon the stability of the diaphragm used. To avoid deterioration temperatures of 50–60 degrees C. should not be exceeded where both strongly alkaline and strongly acidic electrolytes are concerned, in the case where diaphragms of resin material of present commercial quality are employed.

Preferably, where a cation exchange resin material is used as the solid electrolyte for the oxygen electrode, the catalyst for the fuel electrode will preferably consist of activated carbon which, if desired, may contain from 1–20% and preferably from 5–10% by weight of at least 1 metal selected from the group consisting of platinum, palladium, and iridium. Alternatively, the fuel electrode may consist of platinum and/or palladium and/or iridium in a highly dispersed form. The electrode for the oxidizing gas, on the other hand, may consist of the same material as the fuel electrode or of activated charcoal which, if desired, may contain from 1–30% by weight and preferably from 5–20% by weight of silver. Moreover, the oxidizing gas electrode may be made from silver.

Where an anion exchange resin is used in accordance with the invention as the solid electrotyle for the oxygen electrode, the catalyst for the fuel electrode may consist of Raney nickel, double-skeleton catalyst electrode structures wherein Raney nickel is imbedded in a carrier skeleton of conductive material, or the fuel electrode may consist of carbon powder which, if desired, contains from 1 to 20% by weight and preferably from 5 to 10% by weight of at least one metal selected from the group consisting of platinum, palladium, and iridium. The catalyst material used for the oxidizing gas electrode, in this connection, may consist of Raney silver, double skeleton catalyst electrode structures wherein Raney silver is embedded in a carrier skeleton of conductive material, or the electrode may be made from activated charcoal which, if desired, contains 1–20% by weight and preferably from 5 to 10% by weight of silver.

It will be appreciated, therefore, that in accordance with the present invention a fuel cell for the direct electrochemical conversion of the chemical energy of liquid fuels dissolved in liquid electrolytes is contemplated which comprises a fuel-electrolyte liquid mixture fed, fuel electrode, a gas fed oxygen-electrode, and a solid ion exchange membrane serving as electrolyte for the oxygen electrode, and separating the fuel-electrolyte mixture and fuel electrode from the oxygen electrode. Where the electrode material is in particle form, the fuel electrode will include a layer of subsantially even thickness of catalytically active electrode particles in contact on one side with the ion exchange membrane and on the other side with the fuel-electrolyte liquid mixture, said other side being limited with respect to said liquid mixture by a porous liquid-permeable, electrically conductive retaining element. In the same way, the oxygen electrode will include a layer of substantially even thickness of particles of catalytically active electrode material in contact on one side with the ion exchange membrane and on the other side with an oxidizing gas-supplying chamber, said other side being limited with respect to the chamber by a porous, gas-permeable, electrically conductive retaining element. The retaining element may be formed of the same material as the electrode or it may be formed of stainless steel, or especially where anion exchange resins are contemplated as the diaphragm, the retaining elements are preferably made of nickel or silver, or where operating in an acid medium, of alloyed high quality steel.

In accordance with the alternative embodiment, the fuel electrode is in the form of a porous, liquid-premeable, compressed particle-solid body containing the catalytically active material, such body being in abutting contact on one side with the membrane and on the other side with the fuel-electrolyte liquid mixture. In this connection, of course, the oxygen electrode may also be in the form of a porous, gas-permeable, compressed particle-solid body containing the catalytically active material with the solid body being in abutting contact on one side with the membrane and on the other side with the oxidizing gas-supplying chamber.

With more particular reference to the catalytically active material of the electrodes, where the membrane is a cation exchange membrane, the fuel electrode may include a member selected from the group consisting of activated charcoal, platinum, palladium, iridium, and mixtures thereof, while the fuel electrode, where the membrane is an anion exchange membrane, will include a member selected from the group consisting of activated charcoal, platinum, palladium, iridium, mixtures thereof, and Raney nickel. The oxygen electrode may include as catalytically active material where the membrane is a cation exchange membrane, a member selected from the group consisting of activated charcoal, platinum, palladium, iridium, mixtures thereof, silver, and mixtures of activated carbon and silver. On the other hand, where the membrane is an anion exchange membrane, the oxygen electrode may include a member selected from the group consisting of Raney silver and mixtures of activated carbon and silver.

In accordance with a particularly preferred embodiment of the invention, the fuel electrode is provided as a double skeleton catalyst electrode of electrically conductive carrier material having Raney metal granules imbedded therein, such as Raney nickel, while the oxygen electrode is provided as a porous, gas-permeable, solid body of a compressed particle mixture of polyethylene and carbon having on the side facing the membrane a surface layer containing silver oxide dispersed therein in a ratio of 6:5 parts by weight per 15 parts by weight of the polyethylene-carbon mixture.

The present invention is further described with respect to the examples which follow, said examples being set forth by way of illustration and not limitation.

*Example 1*

The fuel cell represented in FIG. 4 was filled with a fuel-electrolyte liquid mixture which was 1 molar with respect to glycol and 1 molar with respect to KOH. The catalyst used on the fuel side was a commercial Raney nickel powder. The catalyst bed on the oxygen side on the other hand consisted of activated charcoal powder mixed with 20% by weight of $Ag_2O$. The diaphragm or membrane consisted of a commercial anion exchange resin material. With this glycol-atmospheric oxygen fuel cell, current in the amount of 2–3 ma./cm.$^2$ at 0.7–0.6 volt could be continuously withdrawn until 70–80% by weight of the KOH was consumed.

*Example 2*

An oxalic acid fuel cell constructed in the same manner as in Example 1 (according to FIGURE 4) contained 2 normal $H_2SO_4$ saturated with oxalic acid as the liquid fuel-electrolyte mixture. The diaphragm consisted of a commercial anion exchange resin material. The catalysts on both sides, i.e. the fuel electrode and the oxygen electrode, consisted of activated charcoal containing 10% by weight of platinum. An electro-motive force of 400–500 mv. was established. The current which could be drawn from the cell was less than 0.5 ma./cm.$^2$ at room temperature.

Example 3

A glycol-KOH-atmospheric oxygen diffusion cell constructed in the manner shown in FIGURE 5 containing an aqueous solution which was 7 molar with respect to KOH and 2.5 molar with respect to glycol as the liquid fuel-electrolyte mixture was operated for electro-chemical conversion of the fuel. The diaphragm consisted of a commercial anion exchange resin material (Permaplex A10). The catalyst on the fuel side (fuel electrode) consisted of a double skeleton catalyst electrode containing Raney nickel as active component whereas the catalyst on the oxidizing gas side (oxygen electrode) consisted of a porous pressed body of activated charcoal and polyethylene. While continuously withdrawing two ma./cm.$^2$, the cell was operated for more than 4 months at room temperature with the potential of the oxygen electrode being —290 mv. with respect to a saturated calomel electrode, whereas the potential of the fuel electrode with respect to the saturated calomel electrode was —1,050 mv. to —1,000 mv. Thus, the terminal voltage ranged between 0.75 and 0.7 volt. The cell was operated at a temperature of from 20–22 degrees C. The polyethylene used was obtained by low pressure polymerization.

Example 4

A fuel cell for liquid fuels was operated for electrochemical conversion of methanol. It was equipped with an oxygen electrode in the form of a square shaped pocket of porous carbon, which was activated by soaking with a solution of silver nitrate in weak nitric acid followed by heating of the thus impregnated electrode body at 250° C. Two catalyst sieve electrodes were provided adjacent the both sides of the pocket shaped electrode in parallel position thereto, these sieve electrodes consisted of parallel microsieves having arranged therebetween nickel-double-skeleton granules (particle size $0.4 < \theta < 1.5$ mm.). See "Dechema Monographien, vol. 38, page 267. The cells was filled with a mixture of KOH-solution and methanol (6 N KOH+2.5 mol CH$_3$OH per liter), and it was operated at 60° C. Oxygen was supplied to the activated carbon electrode at a pressure of 0.9 atm. gauge. The effective voltage amounted to 0.63 v. at a load of 30 ma./cm.$^2$. The fuel electrode had a share of 100 mv. and the oxygen electrode of 500 mv. in the polarization. Due to the direct influence of the peroxide generated at the oxygen electrode, the utilization of the fuel amounted only to 80%.

If the membrane of Permaplex C$_{10}$ was used as electrolyte for the oxygen electrode according to the invention, the effective output of the cell increased from $$0.03 \ [a./cm.^2] \cdot 0.63 \ [volt] = 18.9 \ mw./cm.^2$$

to $0.03 \ [a./cm.^2] \cdot 0.78 \ [volt] = 23.4 \ mw./cm.^2$ since the oxygen electrode was separated from the fuel-electrolyte mixture and the influence of the CH$_3$OH upon the reaction mechanism of the oxygen electrode was inhibited, so that the polarization of the oxygen electrode decreased considerably. Furthermore, the fuel was electrochemically utilized up to 80% and the duration of life of the cell increased from 4 months up to 16 months, since the activity of the oxygen electrode was no longer disturbed by the influence of resinified byproducts.

If the cell described in Example 4 was provided with an oxygen electrode in the form of a square shaped pocket of porous carbon which was activated by soaking with a neutral solution of platinum hexachloride followed by reducing the impregnated carbon electrode at 100 degrees C. in a H$_2$-atmosphere, it was only operable when an ion exchanger membrane according to the invention, serving as electrolyte for the oxygen electrode, was provided between the oxygen electrode and the fuel electrolyte mixture. On the contrary, it was not operative if the cell was worked in the manner mentioned above without an ion exchanger membrane, so that the oxygen electrode was in contact with the electrolyte-fuel mixture, owing to fact that the methanol serving as fuel was dehydrogenated by the active platinum in such manner that the electrode could not adjust a stationary O$_2$-potential. If, on the other hand, the cell was provided with an ion exchanger membrane serving as electrolyte for the oxygen electrode, its output increased about 10% in relation to the same cell operated with the silver containing carbon electrode mentioned above.

The foregoing example illustrates the considerable technical improvement in the development of fuel cells for the direct electrochemical conversion of liquid fuels by using ion exchange membranes as electrolyte for the electrode for the oxidizing gas according to the invention.

We claim:

1. In the process for operating a fuel cell, having a fuel electrode and an oxidizing gas electrode for the direct electrochemical conversion of the chemical energy of liquid fuels dissolved in liquid electrolytes, the improvement which comprises operating the fuel cell by supplying an oxidizing gas to said oxygen electrode and a mixture of a liquid fuel and liquid electrolye to said fuel electrode while maintaining a solid ion exchange membrane capable of transferring ions common to one of such liquid fuel and oxidizing gas, serving as electrolyte for the oxygen electrode in the fuel cell, in abutting contact with said oxygen electrode, and with said fuel electrode as well as with said liquid mixture, and separating the fuel electrode and the mixture of liquid fuel and liquid electrolyte from the oxygen electrode.

2. In the process for operating a fuel cell, having a fuel electrode and an oxidant electrode for the direct electrochemical conversion of the chemical energy of liquid fuels dissolved in liquid electrolytes, the improvement which comprises operating the fuel cell wiah a fuel electrode and an oxidant electrode by supplying an oxidizing gas to the oxidant electrode and a mixture of a liquid fuel and liquid electrolyte to said fuel electrode while maintaining a solid ion exchange membrane selected from the group consisting of cation exchange membranes capable of transferring ions common to such lisuid fuel and anion exchange membranes capable of transferring ions common to such oxidant gas, serving as electrolyte for the oxidant electrode in the fuel cell, in abutting contact with said oxidant electrode, and with said fuel electrode as well as with said liquid mixture, and separating the fuel electrode and the mixture of liquid fuel and liquid electrolyte from the oxidant electrode.

3. Improvement according to claim 2 wherein, where the membrane is a cation exchange membrane, the fuel electrode includes as catalytically active materials, a member selected from the group consisting of activated charcoal, platinum, palladium, iridium, and mixtures thereof, while the oxygen electrode includes as catalytically active material a member selected from the group consisting of activated charcoal, platinum, palladium, iridium, mixtures thereof, silver, and mixtures of activated carbon and silver, and where the membrane is an anion exchange membrane said fuel electrode includes a member selected from the group consisting of activated charcoal, platinum, palladium, iridium, mixtures thereof, and Raney nickel, while said oxygen electrode includes a member selected from the group consisting of Raney silver and mixtures of activated carbon and silver.

4. Improvement according to claim 3 wherein said fuel electrode is in the form of an even layer of particles of catalytically active material in abutting contact on one side with said membrane and on the other side with the fuel-electrolyte liquid mixture, said other side of the fuel electrode being limited with respect to said liquid mixture by a porous, liquid-permeable, electrically conductive retaining element, and said oxygen electrode is in the form of an even layer of particles of catalytically active material in abutting contact on one side with said membrane and on the other side with an oxidizing gas supplying chamber, said other side of the oxygen electrode being limited with respect to said chamber by a porous, gas-permeable, electrically conductive retaining element, both said retaining elements being formed of the same material as the electrode catalytically active material.

5. Improvement according to claim 3 wherein said fuel electrode is in the form of a porous, liquid-permeable, compressed particle-solid body containing the catalytically active material, the fuel electrode solid body being in abutting contact on one side with said membrane and on the other side with the fuel-electrolyte liquid mixture, and said oxygen electrode is in the form of a porous, gas-permeable, compressed-particle-solid body containing the catalytically active material, the oxygen electrode solid body being in abutting contact on one side with said membrane and on the other side with an oxidizing gas-supplying chamber.

References Cited

UNITED STATES PATENTS

| | | | |
|---|---|---|---|
| 2,384,463 | 9/1945 | Gunn et al. | 136—86 |
| 3,013,098 | 12/1961 | Hunger et al. | 136—86 |
| 2,913,511 | 11/1959 | Grubb | 136—86 |
| 2,925,454 | 2/1960 | Justi et al. | 136—86 |
| 2,901,523 | 8/1959 | Justi et al. | 136—86 |
| 2,938,064 | 5/1960 | Kordesch | 136—86 |

ALLEN B. CURTIS, *Primary Examiner.*

JOHN H. MACK, JOHN R. SPECK, *Examiners.*

H. FEELEY, *Assistant Examiner.*

UNITED STATES PATENT OFFICE
CERTIFICATE OF CORRECTION

Patent No. 3,365,333 January 23, 1968

Wolf Vielstich et al.

It is hereby certified that error appears in the above numbered patent requiring correction and that the said Letters Patent should read as corrected below.

Column 2, line 63, strike out "and d' were all obtained in a 6 normal caustic potash solu-" and insert the same after "c'," in line 56, same column 2; column 8, line 36, for "wiah" read -- with --; line 42, for "lisuid" read -- liquid --.

Signed and sealed this 15th day of April 1969.

(SEAL)
Attest:

Edward M. Fletcher, Jr.
Attesting Officer

EDWARD J. BRENNER
Commissioner of Patents